united States Patent Office
3,436,351
Patented Apr. 1, 1969

3,436,351
ALKYLBENZENE SULFONATE HAVING IMPROVED COLOR, ODOR AND HEAT STABILITY
Robert B. Doan, Drexel Hill, and Robert C. Taylor, King of Prussia, Pa., assignors to Atlantic Richfield Company, Philadelphia, Pa., a corporation of Pennsylvania
No Drawing. Filed Nov. 10, 1966, Ser. No. 593,319
Int. Cl. C11d 3/065, 3/02, 1/28
U.S. Cl. 252—137
11 Claims This invention relates to detergent compositions. More particularly, it relates to alkylbenzene sulfonate compositions having improved properties.

It is known in the art to add inorganic salts such as sodium bicarbonate, sodium tripolyphosphate and disodium hydrogen phosphate to alkylbenzene sulfonate compositions to improve the physical properties of the composition. It is also well-known in the art to add various organic compounds such as diphenyl amines, paracresols and other substituted benzenes to detergent compositions to enhance various physical properties. It has now been discovered, however, that detergent compositions which contain both an inorganic salt and certain organic compounds have superior color and odor when compared to compositions containing either the inorganic salt or organic compound alone.

Therefore, it is an object of this invention to provide detergent compositions having improved color, odor and heat stability.

In general, the compositions of this invention comprise in parts by weight, 100 parts of an alkylbenzene sulfonate from 0.001 to 1 part of an organic compound and from 0.2 to 10 parts of a water soluble inorganic salt. When combined with water these compositions can be used in numerous detergent applications such as dishwashing, emulsification and cleaning.

The organic compound is selected from the group consisting of phenyl amines, substituted phenols and other substituted benzenes hereinafter described. The phenyl amines have the structural formula:

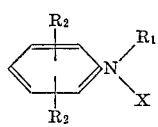

wherein $R_1$ is hydrogen or an alkyl radical containing from one to ten carbon atoms; X is an alkyl radical containing from one to ten carbon atoms or the radical

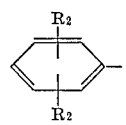

and each $R_2$ is either hydrogen or an alkyl radical and the sum of the carbon atoms from both $R_2$ groups does not exceed ten per phenyl radical. Preferably, X is a phenyl radical, $R_1$ and one $R_2$ are hydrogen and the other $R_2$ is octyl. The most preferred phenyl amine is p,p'-dioctyldiphenyl amine. Additional examples of suitable phenyl amines include but are not limited to:

N-hexyl, N'-octyl, N''-(3-butylphenyl)amine
N-methyl, N'-phenyl, N''-(4-nonylphenyl)amine
N,N'-diphenyl amine
N-phenyl, N'-(3-propyl-5-heptylphenyl)amine
N-(2-methyl-4-isopropylphenyl), N'-(2-ethyl-4-pentylphenyl)amine.

Particularily suited for the practice of this invention are substituted phenols having a structural formula

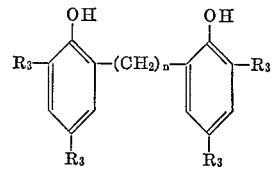

or

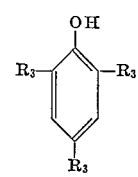

wherein $n$ is an integer ranging from 1 to 3, and each $R_3$ is either hydrogen or an alkyl radical containing from one to four carbon atoms and the molecule has at least two alkyl carbon atoms supplied by one or more of the $R_3$ radicals. Preferably, with respect to the diphenol, $n$ is equal to 1, each para $R_3$ is methyl and each ortho $R_3$ is hydrogen. The most preferable phenol is 2,2-methylene-di-para-cresol. Additional examples of suitable substituted phenols include but are not limited to:

2-(3,5-dimethyl-2-hydroxybenzyl)-4-butyl phenol
2-(3-butyl-5-ethyl-2-hydroxybenzyl)-4,6-dimethyl phenol
2-(2-hydroxybenzyl)-4-ethyl phenol
2-(5-butyl-2-hydroxybenzyl) phenol
2,2-dimethylene-di-para-cresol
2,2-trimethylene-di-para-cresol
2,6-dimethyl phenol
2,4,6-trimethyl phenol
4-butyl phenol
2-methyl-4-propyl phenol.

Other compounds which can be utilized in the practice of this invention are the substituted benzenes having the structural formula

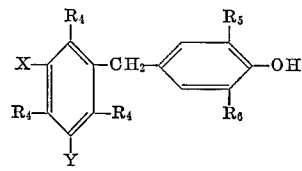

wherein each $R_4$ is either hydrogen or a methyl radical; Y is either hydrogen or the radical

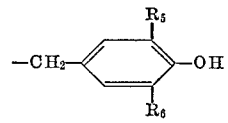

$R_5$ is an alkyl radical containing from one to six carbon atoms and $R_6$ is either an $R_5$ or hydrogen. Preferably, all $R_4$'s are methyl, both Y's are the radical

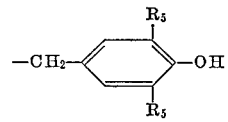

and $R_5$ and $R_6$ are tertiary butyl radicals. Most preferable is 1,3,5-trimethyl - 2,4,6 - tris(3,5-di-t-butyl-4-hydroxybenzyl)benzene. Suitable substituted benzenes include but are not limited to:

para-benzyl phenol
1,5-dimethyl-2,6-bis(3,5 - diethyl - 4 - hydroxybenzyl) benzene 2-(3-butyl-4-hydroxybenzyl) - 4 - (3-methyl - 4 - hydroxybenzyl)benzene 1,3,5-trimethyl-2-(-ethyl - 5 - butyl - 4 - hydroxybenzyl) benzene 1,3,5-trimethyl-2,4,6-tris(3-propyl - 4 - hydroxybenzyl) benzene 3-methyl-2,4,6-tris(3,5-dihexyl - 4 - hydroxybenzyl)benzene.

These organic compounds can be utilized in amounts ranging from 0.001 to 1 part per 100 parts by weight alkylbenzene sulfonate. Most preferably, the concentration ranges from .05 to .25 parts per 100 parts alkylbenzene sulfonate.

The water soluble inorganic salt is selected from the group consisting of $XHCO_3$, $X_2CO_3$, $X_4P_2O_7$, $X_2HPO_4$, $X_3PO_4$, $X_5P_3O_{10}$, $X_2SiO_3$, $X_4SiO_4$, and $X_2B_4O_7$; wherein X is either sodium, potassium or ammonium. Specifically, ortho, tripoly and pyrophosphates; orthophosphites; meta and ortha silicates; carbonates; bicarbonates and borates can be utilized. Preferably, the inorganic salt is a sodium phosphate and most preferably it is disodium hydrogen phosphate. The amount of inorganic salt can range from 0.2 to 10 parts per 100 parts by weight alkylbenzene sulfonate. Most preferably, the concentration of inorganic salts ranges from .5 to 3 parts per 100 parts alkylbenzene sulfonate. Two or more organic compounds or inorganic salts can be combined in a single detergent formulation.

The alkylbenzene sulfonates which can be utilized in this invention are well-known in the art. Generally, they encompass a class of compounds having the structural formula

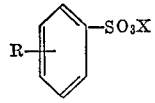

wherein R is an alkyl radical containing 8–16 carbon atoms and X is a hydrophilic cation such as an alkali metal or hydroxyamine radical. Preferably, R is a straight chain alkyl radical containing 10 to 13 carbon atoms.

The compositions of this invention can be prepared by any suitable method. For example, they can be prepared merely by mixing the inorganic salt and the organic compound into the detergent slurry or dried powder. Preferably, the addition is made to the slurry prior to drying.

It has been found that this combination of inorganic salt and organic compound is capable of providing improved color and odor stability in both aqueous solutions or slurries or in the dry powders made therefrom. Consequently, the detergent compositions of this invention can be combined with water in any amount to produce compositions ranging from concentrated slurries (i.e., greater than 60% total solids) to very dilute solutions (i.e., less than 1% total solids). Preferably, the water concentration ranges from 150 to 1,000 parts.

Other ingredients which are commonly added to detergent compositions in order to tailor the composition for a particular end use can be added to the compositions of this invention in functional amounts without departing from the scope thereof. For example, common detergent additives such as hydrotropes heat stabilizers, colorants, degelling agents, viscosity improvers, builders; perfumes and so forth can be added to the compositions of this invention.

It is recognized in the art that major or minor amounts of other ingredients can be added to a detergent composition without destroying their detergent properties. For example, the detergent compositions of this invention can be combined with major or minor amounts of other detergents such as primary alcohol sulfates or alcohol ethoxylates without departing from the scope of this invention.

The following examples are given to illustrate specific embodiments of this invention and should not be construed as limitations upon the scope of the invention.

EXAMPLE I 500 grams of an alkylbenzene sulfonate slurry containing 60 percent by weight solids (of which 95 percent was a predominately linear alkylbenzene sulfonate (LAS) averaging 11.4 carbons per alkyl chain and 5 percent was sodium sulfate) was heated to 160° to 165° F. One gram of each organic compound was added to a sufficient amount of diluent to provide a total solution of 20 milliliters. The diluents were methanol for the p,p'-dioctyldiphenyl amine, water for the 2,2-methylene-di-paracresol and benzene for the 1,3,5-trimethyl-2,4,6-tris(3,5-di-t-butyl-4-hydroxybenzyl)benzene. These mixtures were then pipetted into the hot slurry in amounts sufficient to provide the various concentrations of organic compound given in Tables I and II. The formulations were then placed on a Waring Blendor and the inorganic salts were added in accordance with the amounts set forth in Tables I and II. After mixing for 5 to 6 minutes the slurry was salted with 410 grams of sodium sulfate in order to provide a solid concentration which when reduced to a dry powder would be 40 percent active (LAS). These salted slurries were then placed in a forced air oven at 220° F. for 20 hours. The resulting dry powders were screened through a 14 mesh Tyler screen and an aliquot portion was placed on an aluminum temperature gradient plate. The lengths of time required to cause discoloration in any portion of the sample at 400° F. and 450° F. were measured. These results are reported in Tables I and II. Other aliquot portions of the dry powders were tested for odor by sensory inspection. These samples were then stored in darkness for 18 months at 70° to 85° F. and the odor was again determined. The results are set forth in Tables I and II.

TABLE I

| Formulation Number | 1 | 2 | 3 | 4 | 5 | 6 | 7 | 8 | 9 | 10 |
|---|---|---|---|---|---|---|---|---|---|---|
| Parts by weight per 100 parts LAS: | | | | | | | | | | |
| Organic Compound | 0 | 0 | | | 0 | | | | | |
| Diphenyl Amine | | | | | | 0.1 | 0.1 | | | |
| 1,3,5-trimethyl-2,4,6-tris(3,5-di-t-butyl-4-hydroxybenzyl)benzene | | | | | | | | 0.1 | 0.1 | 0.1 |
| 2,2-methylene-di-para-cresol | | | 0.1 | 0.1 | | | | | | 0.1 |
| Inorganic Salt | 0 | | 0 | | | 0 | | 0 | | |
| Sodium Bicarbonate | | 2.0 | | 2.0 | 5.0 | | 2.0 | | 2.0 | |
| Sodium Tripolyphosphate | | | | | | | | | | 2.0 |
| Properties of Dried Powder: | | | | | | | | | | |
| Heat Stability at 400° F. sec | 84 | 84 | 125 | 185 | 125 | 115 | 240 | 105 | 200 | 400 |
| Heat Stability at 450° F. sec | 24 | 24 | 27 | 53 | 36 | 35 | 70 | 30 | 60 | 20 |
| Initial Odor [1] | 40 | 30 | 10 | 20 | 25 | 30 | 10 | 30 | 10 | 10 |
| Odor after 18 months storage [1] | 50 | 50 | 30 | 30 | 50 | 30 | 20 | 50 | 20 | 30 |

[1] Ratings.—No odor (10); Very slight odor (10–20); Slight odor (20–30); Medium odor (30–40); Strong odor (40–50). Eighteen month storage, in darknes at ambient temperatures (70 to 80° F.).

By comparing Formulation Nos. 2 and 3 with 4, 2 and 6 with 7 or 2 and 8 with 9, the improvements obtained from the practice of this invention are demonstrated. Despite the fact that sodium bicarbonate alone does not affect the heat stability of the dried powder and the use of 2,2-methylene-di-para-cresol alone only provides for a 48 percent and 12 percent increase in the 400° to 450° F. heat stabilities; the combination of the two ingredients imparts a 120 percent increase in both heat stabilities. Similarly, while p,p'-dioctyldiphenyl amine provides only 37 and 46 percent increase in heat stability the improvement obtained upon its combination with sodium bicarbonate is 185 and 212 percent. (Compare 2 and 6 with 7.) The combination of 1,3,5-trimethyl-2,4,6-tris(3,5-ditertiary butyl-4-hydroxybenzyl)benzene and sodium bicarbonate imparts a 138 and 185 percent increase in heat stability in contrast to the 25 percent improvement obtained by using the organic compound alone. (Compare 2 and 8 with 9.)

original slurry of Example 1 (but taken from a different production batch) was diluted with water until the total solids was 40 percent by weight. The slurry was then heated to 120° F. The organic compound diluent mixtures were prepared as described in Example I and then diluted further to provide a 1 percent solution. This solution was then added to various aliquots of the slurry along with the different alkali metal salts in amounts sufficient to provide the concentrations set forth in Table III. These

TABLE II

| Formulation Number | 11 | 11 | 13 | 14 | 15 | 16 | 17 | 18 |
|---|---|---|---|---|---|---|---|---|
| Parts by weight per 100 parts LAS: | | | | | | | | |
| Organic Compound | 0 | 0 | | | | | | |
| 1,3,5-trimethyl-2,4,6-tris(3,5-di-t-butyl-4-hydroxybenzyl)benzene | | | 0.1 | 0.1 | .04 | .02 | .02 | .02 |
| Alkali Metal Salt | | 0 | | | | | | |
| Sodium Metasilicate | | | 2.0 | | 2.0 | 2.0 | 1.0 | 5.0 |
| Properties of the dried powder: | | | | | | | | |
| Heat Stability at 400° F. sec | 84 | 110 | 105 | 600 | 420 | 310 | 215 | 600 |
| Heat Stability at 450° F. sec | 24 | 33 | 30 | 185 | 122 | 92 | 64 | 180 |
| Initial Odor [1] | 40 | 25 | 30 | 10 | 10 | 10 | 10 | 10 |
| Odor after 18 months storage [1] | 50 | 50 | 50 | 20 | 20 | 20 | 20 | 10 |

[1] As defined in Table I.

A comparison of Formulation Nos. 12, 13 and 14 in Table II demonstrates that the combination of 1,3,5-trimethyl-2,4,6-tris(3,5-di-t-butyl-4-hydroxybenzyl)benzene and sodium meta silicate imparts 615 and 470 percent increases in the heat stabilities while comparable amounts of each compound alone only impart a maximum of a 31 and 37 percent increase in the stabilities. Furthermore, even when the concentration of each compound has been greatly reduced (Formulation 17) the improvements in heat stability are 156 and 167 percent, respectively. The odor is likewise improved over compositions containing each compound alone.

EXAMPLE II

A slurry having the same chemical properties as the original slurry of Example 1 (but taken from a different production batch) was diluted with water until the total solids was 40 percent by weight. The slurry was then heated to 120° F. The organic compound diluent mixtures were prepared as described in Example I and then diluted further to provide a 1 percent solution. This solution was then added to various aliquots of the slurry along with the different alkali metal salts in amounts sufficient to provide the concentrations set forth in Table III. These formulations were then stirred until the alkali metal salt was completely dispersed. Each formulation was then divided into 2 portions. One portion was salted with sodium sulfate in an amount sufficient to provide a solids concentration which was 40 percent active (LAS) on a dry basis. This salted slurry was dried for 20 hours at 220° F. in a forced air oven. The dried powder was run through a 5 mesh Tyler sieve and a portion was used for Klett color determination. The nonsalted slurry was capped in bottles and kept in a 180° F. oven. At the end of 7 days, the samples were aerated and recapped. At the end of 14 days, the Klett color was measured. Results are reported in Table III. This procedure was repeated on similar slurries taken from different production runs. The results are reported in Tables IV, V and VI.

TABLE III

| Formulation Number | 19 | 20 | 21 | 22 | 23 | 24 | 25 | 26 | 27 | 28 |
|---|---|---|---|---|---|---|---|---|---|---|
| Parts by weight per 100 parts LAS: | | | | | | | | | | |
| Organic Compound | 0 | | 0 | | 0 | | 0 | | 0 | |
| 2,2-methylene-di-para-cresol | | .015 | | .005 | | .005 | | .005 | | .015 |
| Inorganic Salt | 0 | 0 | | | | | | | | |
| Sodium tripolyphosphate | | | 1.5 | 0.5 | | | | | | |
| Potassium Pyrophosphate | | | | | 1.5 | 0.5 | | | | |
| Sodium Orthosilicate | | | | | | | 1.5 | 0.5 | | |
| Disodium Hydrogen Phosphate | | | | | | | | | 1.5 | 1.5 |
| Slurry after 14 days at 180° F.: | | | | | | | | | | |
| Klett Color [2] | 57 | 75 | 75 | 52 | 46 | 35 | 107 | 97 | 51 | 45 |
| Odor [1] | 50 | 50 | 50 | 40 | 45 | 40 | 45 | 50 | 50 | 45 |
| Dry Powder after 20 hours at 220° F.: | | | | | | | | | | |
| Klett Color [2] | 475 | 226 | 125 | 92 | 148 | 89 | 112 | 78 | 170 | 93 |
| Odor [1] | 50 | 40 | 30 | 20 | 30 | 20 | 20 | 15 | 40 | 35 |

[1] As defined in Table I.
[2] The Klett-Summerson Color Test was conducted as follows.—A No. 42 blue filter was placed in a Klett-Summerson photoelectric colorimeter having a 100 watt light source. The instrument was adjusted to 0 using a 40 milliliter glass cell filled with distilled water. The sample was prepared as 4 percent slurry of which 40 ml. was then placed in a similar cell and the instrument was readjusted to 0. The Klett-Summerson color value was then read directly from the scale. This value is a measure of the light absorptivity properties of the slurry with the higher numbers signifying greater light absorption.

TABLE IV

| Formulation Number | 29 | 30 | 31 | 32 | 33 | 34 |
|---|---|---|---|---|---|---|
| Parts by weight per 100 parts LAS: | | | | | | |
| Organic Compound | 0 | | 0 | | | |
| 2,2-methylene-di-para-cresol | | .015 | | .015 | .015 | .015 |
| Inorganic Salt | 0 | 0 | | | | |
| Trisodium Phosphite | | | 1.5 | 1.5 | | |
| Sodium Orthosilicate | | | | | 1.5 | |
| Sodium Tetraborate | | | | | | 1.5 |
| Slurry after 14 days at 180° F.: | | | | | | |
| Klett Color [2] | 110 | 118 | 68 | 53 | 110 | 85 |
| Odor [1] | 50 | 50 | 50 | 30 | 30 | 40 |
| Powder after 20 hours at 220° F.: | | | | | | |
| Klett Color [2] | 900 | 640 | 142 | 175 | 115 | 210 |
| Odor [1] | 50 | 50 | 30 | 15 | 15 | 25 |

[1,2] As defined in Table III.

TABLE V

| Formulation Number | 35 | 36 | 37 | 38 | 39 | 40 | 41 | 42 | 43 | 44 |
|---|---|---|---|---|---|---|---|---|---|---|
| Parts by weight per 100 parts LAS: | | | | | | | | | | |
| Organic Compound | 0 | | 0 | | | | | | | |
| 2,2-methylene-di-para-cresol | | .015 | | .015 | .015 | .015 | .005 | .002 | .001 | .005 |
| Inorganic Salt | 0 | 0 | | | | | | | | |
| Disodium Hydrogen Phosphate | | | 1.5 | 1.5 | 0.5 | 0.2 | 1.5 | 1.5 | 1.5 | .5 |
| Slurry after 14 days at 180° F.: Klett Color [2] | 110 | 118 | 79 | 50 | 61 | 70 | 65 | 70 | 50 | 80 |

[2] As defined in Table III.

TABLE VI

| Formulation Number | 45 | 46 | 47 | 48 | 49 |
|---|---|---|---|---|---|
| Parts by weight per 100 parts LAS: | | | | | |
| Organic Compound: | | | | | |
| 2,2-methylene-di-para-cresol | 0 | 0 | 0.015 | 0.0075 | .0075 |
| p,p'-Dioctyldiphenyl amine | 0 | 0 | 0 | 0.0075 | .0075 |
| Inorganic Salt: Disodium Hydrogen Phosphate | 0 | 1.5 | 0 | 0 | 1.5 |
| Slurry after 14 days at 180° F.: Klett Color [2] | 44 | 61 | 105 | 70 | 48 |
| Dry Powder after 20 hours at 220° F.: Klett Color [2] | 350 | 234 | 700 | 425 | 158 |
| Odor: [1] | | | | | |
| After 6 days | 50 | 35 | 50 | 45 | 20 |
| After 30 days | 50 | 50 | 50 | 50 | 35 |

[1] As defined in Table I.
[2] As defined in Table III.

We claim:
1. A stabilized alkylbenzene sulfonate composition comprising in parts by weight 100 parts alkylbenzene sulfonate, and
   (a) from 0.001 to 1 part of an organic compound having a structural formula selected from the group consisting of:

(1)

wherein $R_1$ is hydrogen or an alkyl radical containing from one to ten carbon atoms; X is an alkyl radical containing from one to ten carbon atoms or the radical and each $R_2$ is either hydrogen or an alkyl radical and the sum of the carbon atoms from both $R_2$ groups does not exceed ten per phenyl radical, (2)

wherein $n$ is an integer ranging from 1 to 3 and each $R_3$ is either hydrogen or an alkyl radical containing from one to four carbon atoms, and the molecule has at least two alkyl carbon atoms supplied by one or more of the $R_3$ radicals, (3)

wherein each $R_3$ is either hydrogen or an alkyl radical containing from one to four carbon atoms and the molecule has at least two alkyl carbon atoms supplied by one or more of the $R_3$ radicals, (4)

wherein $R_4$ is either hydrogen or a methyl radical; Y is either hydrogen or the radical $R_5$ is an alkyl radical containing from one to four carbon atoms, and $R_6$ is either an $R_5$ or hydrogen,
   (5) mixtures thereof,
   (b) from 0.2 to 10 parts of a water soluble inorganic salt selected from the group consisting of $XHCO_3$, $X_2CO_3$, $X_4P_2O_7$, $X_2HPO_4$, $X_3PO_4$, $X_5P_3O_{10}$, $X_2SiO_3$, $X_4SiO_4$ and $X_2B_4O_7$, and mixtures thereof wherein X is either sodium, potassium or ammonium.

2. A composition according to claim 1 wherein the inorganic salt is a sodium salt.
3. An aqueous solution or slurry of the composition of claim 1.
4. A composition according to claim 1 wherein the inorganic salt is an alkali metal phosphate.
5. A composition according to claim 1 wherein the organic compound is a substituted phenol having the structural formula selected from the group consisting of and wherein $n$ is an integer ranging from 1 to 3 and each $R_3$ is either hydrogen or an alkyl radical containing from one to four carbon atoms.
6. A composition according to claim 1 wherein the inorganic salt is present in amounts ranging from 0.5 to 3 parts per 100 parts alkylbenzene sulfonate.
7. A composition according to claim 1 wherein the organic compound is present in amounts ranging from 0.05 to 0.25 parts per 100 parts alkylbenzene sulfonate.
8. A composition according to claim 1 wherein the organic compound is p,p'-dioctyldiphenyl amine.
9. A composition according to claim 1 wherein the organic Compound 2 is 2,2-methylene-di-para-cresol.
10. A composition according to claim 1 wherein the organic Compound 4 is 1,3,5-trimethyl-2,4,6-tris(3,5-di-t-butyl-4-hydroxybenzyl)benzene.
11. A composition according to claim 1 comprising 100 parts of an alkylbenzene sulfonate from 150 to 1,000 parts water and from .001 to 1 part of 2,2-methylene-di-para-cresol and from .2 to 10 parts of disodium hydrogen phosphate.

References Cited

UNITED STATES PATENTS 2,469,376  5/1949  Flett _____ 260—505
2,831,021  4/1958  Stayner _____ 260—505

LEON D. ROSDOL, *Primary Examiner.*

S. D. SCHWARTZ, *Assistant Examiner.*

U.S. Cl. X.R.

252—401, 404, 152, 161, 138; 260—505